Figure 1:
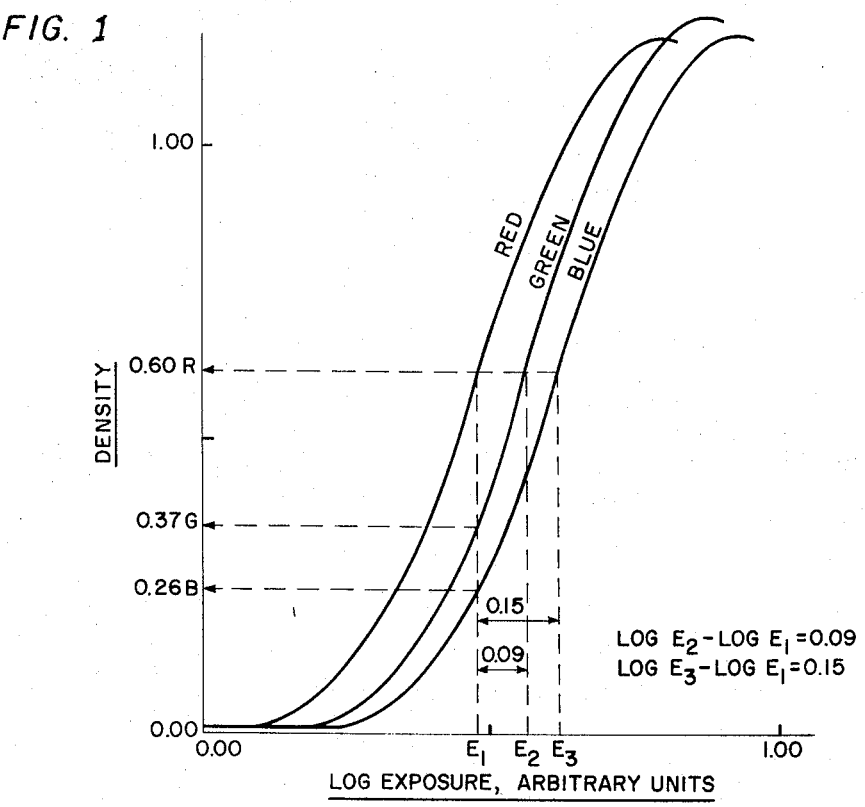

United States Patent [19]
Levy et al.

[11] 3,784,377
[45] Jan. 8, 1974

[54] CURVE ANALYSIS METHOD IN COLOR PRINTING

[75] Inventors: Marilyn Levy, Red Bank; Richard G. LeSchander, Trenton, both of N.J.

[73] Assignee: The United States of America as represented by the Secretary of the Army, Washington, D.C.

[22] Filed: Apr. 10, 1972

[21] Appl. No.: 242,602

[52] U.S. Cl............................ 96/23, 96/24, 355/35
[51] Int. Cl.............................................. G03c 7/16
[58] Field of Search .................... 96/23, 24; 355/35

[56] References Cited
UNITED STATES PATENTS
3,672,766  6/1972  Levy ........................................ 96/24

*Primary Examiner*—Norman G. Torchin
*Assistant Examiner*—Richard L. Schilling
*Attorney*—Harry M. Saragovitz et al.

[57] ABSTRACT

The proper color balance to be used in making a color print in color photography from a color negative is determined from analysis of the characteristic curves generated from a test print of a continuous wedge or a stepped density tablet exposed through the unexposed processed portion of the emulsion to be balanced.

This invention relates to the use of a curve analysis method in determining the proper color balance necessary to make a color print from a color negative.

4 Claims, 2 Drawing Figures

CURVE ANALYSIS METHOD IN COLOR PRINTING

BACKGROUND OF THE INVENTION

In U.S. Pat. application Ser. No. 134,298, now U.S. Pat. No. 3,672,766, of Marilyn Levy, filed Apr. 15, 1971 for "Color Printing Method," and assigned to a common assignee, a method is described whereby proper color balance is obtained by exposing through the unexposed processed portion of the film to produce a neutral density (grey) image, i.e., one with equal densities to red, green and blue light. That application also describes a step tablet composed of various color filters and details its use in choosing the correct color balance. Though Ser. No. 134,298 represents a significant step forward in the art of color printing in color photography, it has a disadvantage in that the method is a subjective estimate depending on the operator's judgement of color match.

SUMMARY OF THE INVENTION

The general object of this invention is to provide a method of determining the proper color balance in making a color print in color photography from a color negative. A more specific object of the invention is to provide such a method that will be objective and not dependent on the operator's judgement of color match.

In the method of this invention, the proper color balance is derived from analysis of the characteristic curves generated from a test print of a continuous wedge or stepped density tablet exposed through the unexposed processed portion of the emulsion to be balanced. The method of the invention works equally well for positive transparencies as for prints. The method is based upon the fact that the proper color balance can be determined by inspecting the characteristic curves of the test print and calculating the filtration or exposure required to shift any two of the curves into coincidence with the third.

DESCRIPTION OF THE DRAWING AND THE PREFERRED EMBODIMENT

In this example, a substractive method is used to carry out the invention. A test print is made by exposing a continuous density wedge or a stepped density wedge through a piece of unexposed processed color negative emulsion and any arbitrary filter pack. The characteristic curves of FIG. 1 show the relationship between the densities to red, green and blue light and log exposure. They are obtained by reading the reflection densities to red, green and blue light of a test print exposed through a continuous density wedge and a color filter pack arbitrarily exposed of a CC (color compensating) 50M (magenta), CC50Y (yellow) and a CC20Y filter to give a filter pack of CC50M70Y. Color compensating filters are commercially available in densities of 0.025, 0.05, 0.10, 0.20, 0.30, 0.40, and 0.50 only, so that various combinations may have to be used to obtain the desired filter pack. It is to be understood that the choice of any filter pack, or none at all, is immaterial to the application of this invention. In making the test print, any commercially available enlarging lamp is used as the light source, any commercially available density wedge or step tablet is used as the wedge or step tablet, and the color negative emulsion to be balanced is used as the unexposed processed emulsion. The arrangement of the color filter pack and the color negative emulsion between the light source and the printing medium is not critical. The sole requirement is that both the negative and the filter pack are somewhere between the light source and the color print material. The continuous density or stepped density wedge is in contact with the printing medium.

To produce a neutral (grey) print, the exposures to red, green and blue light must be adjusted so as to produce equal densities to red, green and blue light on the printing medium. It is noted in FIG. 1 that; if one arbitrarily chooses to obtain a grey test print at a red density of 0.60, corresponding to $E_1$, one must raise the green density from 0.37 to 0.60, and the blue density from 0.26 to 0.60. If one could increase the green exposure by (Log $E_2$ – Log $E_1$), equal to a $\Delta$ logE of 0.09 in this example, and increase the blue exposure by (Log $E_3$ – Log $E_1$), equal to a $\Delta$ logE of 0.15 in the example, the green and blue densities respectively would be raised to the proper level.

However, in the subtractive method of color printing there is but one (white-light) exposure, so that the only way to increase the exposures of the green- and blue-sensitive layers of the emulsion is to decrease the densities of the color filters holding back the green and blue components of the white-light exposure, i.e., the magenta and yellow filters, respectively. The amount of the decrease in density of the filters in this example is $\Delta$ logE = (Log $E_2$ – Log $E_1$), or 0.09 for the magenta filter, and $\Delta$ logE = (Log $E_3$ – Log $E_1$), or 0.15 for the yellow filter. This difference in log Exposure is equivalent to the same number of density units. One would therefore expect that he would have only to subtract a CC09M filter and a CC15Y filter from the test print's filter pack in order to get the filter pack which balances the emulsion. However, CC filters are not made in values of 0.09 or 0.15, and they would probably not have densities of 0.09 or 0.15, respectively, in any case.

That is, the value assigned to any color filter by its manufacturer is a "nominal" value and does not take account of the considerable impurity found in them. For example, a CC50M filter does not have 0.00 red density, 0.50 green density and 0.00 blue density. It has instead 0.07 red density, 0.54 green density and 0.11 blue density. The accompanying TABLE allows a rapid determination of the actual effective density for any of the filter packs listed. The TABLE is prepared by reading the transmission densities to red, green and blue light of KODAK CC magenta and yellow filters of 0.05, 0.10, 0.20, 0.30, 0.40, and 0.50 nominal value. It is to be understood that any other series of commercially available filters could be so analyzed and tabulated.

Having obtained the red, green and blue densities of each filter, an amount of density equal to the red density is subtracted from each of the three densities, reducing the red density to zero (which is dropped from the TABLE) and greatly easing further calculations. Since subtracting equal amounts of red, green and blue density is exactly equal to subtracting neutral density, this simplification does not change the color filtering aspects of the filter pack; it merely alters its neutral density. For example, a filter pack having a red density of 0.00, a green density of 0.20 and a blue density of 0.40 would have exactly the same color filtering effect as a filter pack with a red density of 0.10, a green den-

NOMINAL VALUE OF KODAK CC MAGENTA FILTER

TABLE

| | 00 | 05 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|---|
| 100 | 94 08 | 94 15 | 94 19 | 94 26 | 95 29 | 95 36 | 94 39 | 94 46 | 95 47 | 95 54 | 95 55 | 95 62 | 95 66 | 95 73 | 96 76 | 96 83 | 95 85 | 95 89 | 96 94 | 96 101 | 96 102 |
| 95 | 87 09 | 87 16 | 87 20 | 87 27 | 88 30 | 88 37 | 87 40 | 87 47 | 88 48 | 88 55 | 88 56 | 88 63 | 88 67 | 88 74 | 89 77 | 89 84 | 88 86 | 88 90 | 89 95 | 89 102 | 89 103 |
| 90 | 83 07 | 83 14 | 83 18 | 83 25 | 84 28 | 84 35 | 83 38 | 83 45 | 84 46 | 84 53 | 84 54 | 84 61 | 84 65 | 84 72 | 85 75 | 85 82 | 84 84 | 84 88 | 85 93 | 85 100 | 85 101 |
| 85 | 77 08 | 77 15 | 77 19 | 77 26 | 78 29 | 78 36 | 77 39 | 77 46 | 78 47 | 78 54 | 78 55 | 78 62 | 78 66 | 78 73 | 79 76 | 79 83 | 78 85 | 78 89 | 79 94 | 79 101 | 79 102 |
| 80 | 73 06 | 73 13 | 73 17 | 73 24 | 74 27 | 74 34 | 73 37 | 73 44 | 74 45 | 74 52 | 74 53 | 74 60 | 74 64 | 74 71 | 75 74 | 75 81 | 74 83 | 74 87 | 75 92 | 75 99 | 75 100 |
| 75 | 68 08 | 68 15 | 68 19 | 68 26 | 69 29 | 69 36 | 68 39 | 68 46 | 69 47 | 69 54 | 69 55 | 69 62 | 69 66 | 69 73 | 70 76 | 70 83 | 69 85 | 69 89 | 70 94 | 70 101 | 70 102 |
| 70 | 64 06 | 64 13 | 64 17 | 64 24 | 65 27 | 65 34 | 64 37 | 64 44 | 65 45 | 65 52 | 65 53 | 65 60 | 65 64 | 65 71 | 66 74 | 66 81 | 65 83 | 65 87 | 66 92 | 66 99 | 66 100 |
| 65 | 60 08 | 60 15 | 60 19 | 60 26 | 61 29 | 61 36 | 60 39 | 60 46 | 61 47 | 61 54 | 61 55 | 61 62 | 61 66 | 61 73 | 62 76 | 62 83 | 61 85 | 61 89 | 62 94 | 62 101 | 62 102 |
| 60 | 56 06 | 56 13 | 56 17 | 56 24 | 57 27 | 57 34 | 56 37 | 56 44 | 57 45 | 57 52 | 57 53 | 57 60 | 57 64 | 57 71 | 58 74 | 58 81 | 57 83 | 57 87 | 58 92 | 58 99 | 58 100 |
| 55 | 51 06 | 51 13 | 51 17 | 51 24 | 52 27 | 52 34 | 51 37 | 51 44 | 52 45 | 52 52 | 52 53 | 52 60 | 52 64 | 53 71 | 53 74 | 52 81 | 52 83 | 53 87 | 53 92 | 53 99 | 53 100 |
| 50 | 47 04 | 47 11 | 47 15 | 47 22 | 48 25 | 48 32 | 47 35 | 47 42 | 48 43 | 48 50 | 48 51 | 48 58 | 48 62 | 49 69 | 49 72 | 48 79 | 48 81 | 49 85 | 49 90 | 49 97 | 49 98 |
| 45 | 40 05 | 40 12 | 40 16 | 40 23 | 41 26 | 41 33 | 40 36 | 40 43 | 41 44 | 41 51 | 41 52 | 41 59 | 41 63 | 42 70 | 42 73 | 41 80 | 41 82 | 42 86 | 42 91 | 42 98 | 42 99 |
| 40 | 36 03 | 36 10 | 36 14 | 36 21 | 37 24 | 37 31 | 36 34 | 36 41 | 37 42 | 37 49 | 37 50 | 37 57 | 37 61 | 37 68 | 38 71 | 38 78 | 37 80 | 37 84 | 38 89 | 38 96 | 38 97 |
| 35 | 30 04 | 30 11 | 30 15 | 30 22 | 31 25 | 31 32 | 30 35 | 30 42 | 31 43 | 31 50 | 31 51 | 31 58 | 31 62 | 31 69 | 32 72 | 32 79 | 31 81 | 31 85 | 32 90 | 32 97 | 32 98 |
| 30 | 26 02 | 26 09 | 26 13 | 26 20 | 27 23 | 27 30 | 26 33 | 26 40 | 27 41 | 27 48 | 27 49 | 27 56 | 27 60 | 27 67 | 28 70 | 28 77 | 27 79 | 27 83 | 28 88 | 28 95 | 28 96 |
| 25 | 21 04 | 21 11 | 21 15 | 21 22 | 22 25 | 22 32 | 21 35 | 21 42 | 22 43 | 22 50 | 22 51 | 22 58 | 22 62 | 23 69 | 23 72 | 22 79 | 22 81 | 22 85 | 23 90 | 23 97 | 23 98 |
| 20 | 17 02 | 17 09 | 17 13 | 17 20 | 18 23 | 18 30 | 17 33 | 17 40 | 18 41 | 18 48 | 18 49 | 18 56 | 18 60 | 19 67 | 19 70 | 18 77 | 18 79 | 19 83 | 19 88 | 19 95 | 19 96 |
| 15 | 13 04 | 13 11 | 13 15 | 13 22 | 14 25 | 14 32 | 13 35 | 13 42 | 14 43 | 14 50 | 14 51 | 14 58 | 14 62 | 15 69 | 15 72 | 14 79 | 14 81 | 15 85 | 15 90 | 15 97 | 15 98 |
| 10 | 09 02 | 09 09 | 09 13 | 09 20 | 10 23 | 10 30 | 09 33 | 09 40 | 10 41 | 10 48 | 10 49 | 10 56 | 10 60 | 11 67 | 11 70 | 10 77 | 10 79 | 10 83 | 11 88 | 11 95 | 11 96 |
| 05 | 04 02 | 04 09 | 04 13 | 04 20 | 05 23 | 05 30 | 04 33 | 04 40 | 05 41 | 05 48 | 05 49 | 05 56 | 05 60 | 06 67 | 06 70 | 05 77 | 05 79 | 06 83 | 06 88 | 06 95 | 06 96 |
| 00 | 00 00 | 00 07 | 00 11 | 00 18 | 01 21 | 01 28 | 00 31 | 00 38 | 01 39 | 01 46 | 01 47 | 01 53 | 01 58 | 02 65 | 02 68 | 01 75 | 01 78 | 01 85 | 02 86 | 02 93 | 02 94 |
| | 00 | 05 | 10 | 15 | 20 | 25 | 30 | 35 | 40 | 45 | 50 | 55 | 60 | 65 | 70 | 75 | 80 | 85 | 90 | 95 | 100 |

NOMINAL VALUE OF KODAK CC YELLOW FILTER sity of 0.30 and a blue density of 0.50. It would, however, have 0.10 less neutral density, because 0.10 red density + 0.10 green density + 0.10 blue density = 0.10 neutral density, which has no color filtering power at all. One could call 0.20 green/0.40 blue the "equivalent density" of the filter pack containing actual red, green and blue densities of 0.10, 0.30 and 0.50 respectively.

Because of the "nominal" nature of the designated value of a color filter, it follows that a filter pack containing 10 filters of nominal value 05 each would not generally have the same color filtering effect as a filter pack containing one filter of nominal value 50, or one containing one filter of nominal value 20 and one of nominal value 30, etc. Thus, it is necessary to construct the TABLE and the filter packs similarly. That is, if one adds the density readings of a CC50M filter and a CC50Y filter to obtain the values for the equivalent densities of a CC50M50Y filter pack, and enters those values in the TABLE, it is necessary to use one CC50M filter and one CC50Y filter to make up the CC50M50Y filter pack. Any other combination of magenta and yellow filters which adds up to CC50M50Y will not yield the same equivalent densities except by accident.

In the TABLE, the ordinate values refer to the nominal magenta value of the filter pack, while the abscissa values refer to the nominal yellow value of the filter pack. In addition, each of the squares in the TABLE has an upper and a lower number. The upper number represents the equivalent density to green light of the filter pack, while the lower number represents the equivalent density to blue light of the filter pack, the decimal points being dropped to enhance readability. The filter pack with these actual equivalent densities is described by the nominal magenta and yellow values which intersect the square of interest, e.g., CC45M55Y would be the designation for the filter pack composed of a CC40M, a CC05M, a CC50 Y and a CC05Y filter, the combination of which has equivalent densities of 0.41 to green light and 0.59 to blue light. Referring to the TABLE, it is apparent that the CC50M70Y filter pack used to make the test print whose characteristic curves are shown in FIG. 1 has equivalent densities to green and blue light of 0.49 and 0.72 respectively. To correct the test print, requires, as calculated above, the subtraction of 0.09 units of density to green light (i.e., magenta filtration) and 0.15 units of density to blue light (yellow filtration). Making the subtraction from the equivalent densities of the test print filter pack will yield the equivalent densities of the filter pack which will balance the emulsion, which are 0.49−0.09=0.40 equivalent green density, and 0.72−0.15=0.57 equivalent blue density. Looking for these values in the TABLE, it is apparent that they are not there. It is therefore necessary in this case to find the values closest to the ones that are needed. These values are 0.41 equivalent green density and 0.59 equivalent blue density, which are the equivalent densities for a CC45M55Y filter pack, which is therefore the filter pack which will most accurately balance the test print and this particular color negative emulsion. To summarize the calculations:

|  |  |  |
|---|---|---|
| equivalent density of test filter pack(CC50M70Y) | 49 | 72 |
| (+) correction required (from FIG. 1) | −09 | −15 |
| (=) equivalent density of correct filter pack | 40 | 57 |

Finding the 57 40 square in the TABLE, or the closest one to it, we see that it corresponds to a CC45M55Y filter pack.

In the foregoing example, the green and blue curves were shifted into coincidence with the red curve. It is to be understood however, that one could also shift the red and blue curves into coincidence with the green curve. In such an instance, a cyan filter would be used to adjust the red component of the white-light exposure and a yellow filter would be used to adjust the blue component of the white-light exposure. Similarly, one could also shift red and green curves into coincidence with the blue curve. In that case, a cyan filter would be used to adjust the red component of the white-light exposure while a magenta filter would be used to adjust the green component of the white-light exposure.

One could also carry out the aforedescribed subtractive method using a continuous density wedge or stepped density wedge but without a color compensating filter pack. In such a case, the same general method is used as above-described resulting as before in discrete characteristic red, green, and blue curves. One then determines from each of the curves the adjustment of the exposures required to shift any two of the curves, as for example, the green and blue curves into coincidence with the third curve, as for example, the red curve and produce equal densities to red, green, and blue light on the printing medium. The required amounts of exposure adjustment are then converted into equivalent amounts of density units of color compensating filters, as for example, magenta and yellow filters. One then makes reference again to the TABLE to locate the square containing those equivalent density values for magenta and yellow. The correct nominal values of magenta and yellow filtration corresponds to the respective ordinate and abscissa values intersecting at that square. These nominal values are of course the values of the color compensating filter pack that will balance the emulsion.

EXAMPLE II

In this example, an additive method is used to carry out the invention. This method can best be understood by referring to FIG. 2, which displays the characteristic curves of a test print made by the additive method. These curves are obtained by exposing a continuous density wedge each of three times through the unexposed processed portion of the emulsion to be balanced and Kodak Wratten Filters 25A (red), 98 (blue) and 99 (green) in succession. A common enlarging lamp was used as the light source in this example. It is to be understood, however, that any other commercially available light source could be used with any other essentially monochromatic set of red, green and blue filters; that three separate red, green and blue light sources could be used instead of one white-light source and three filters; and that any commercially available continuous or stepped density wedge would suffice. The order of the three exposures is not critical to the application of this invention. Moreover, the spatial relationship among the elements of the printing system is not critical, except that the filters (if used), the unexposed processed emulsion to be balanced, and the continuous wedge or step tablet must all be somewhere between the light source and the printing medium.

As a matter of convenience, the three exposure times of the test print are calculated to allow equal amounts of light to reach the paper during each exposure. Each filter is essentially monochromatic, passing only a narrow band of wavelengths, but the filters do not transmit their respective predominant wavelengths to the same degree. In this example, the red filter transmits approximately 85 percent of the red light falling upon it (and almost none of the rest), the green filter transmits 13 percent of the green light falling upon it, and almost none of the rest, while the blue filter transmits 35 percent of the blue light striking it and practically none of the rest of the light falling upon it. If the three exposures are made such that the ratio of any two exposure times is the reciprocal of the ratio of the corresponding transmittances, equal amounts of light energy will impinge upon the printing medium (in this case, paper) during each of the three exposures, enabling one to plot all three characteristic curves on one and the same Log Rel. Exposure v. Density coordinate system, as in FIG. 2. In this example, a red exposure time of 5.0 seconds was used as a base for the calculations, which then yield a green exposure time of 32.3 seconds and a blue exposure time of 12.2 seconds.

Figure 2:
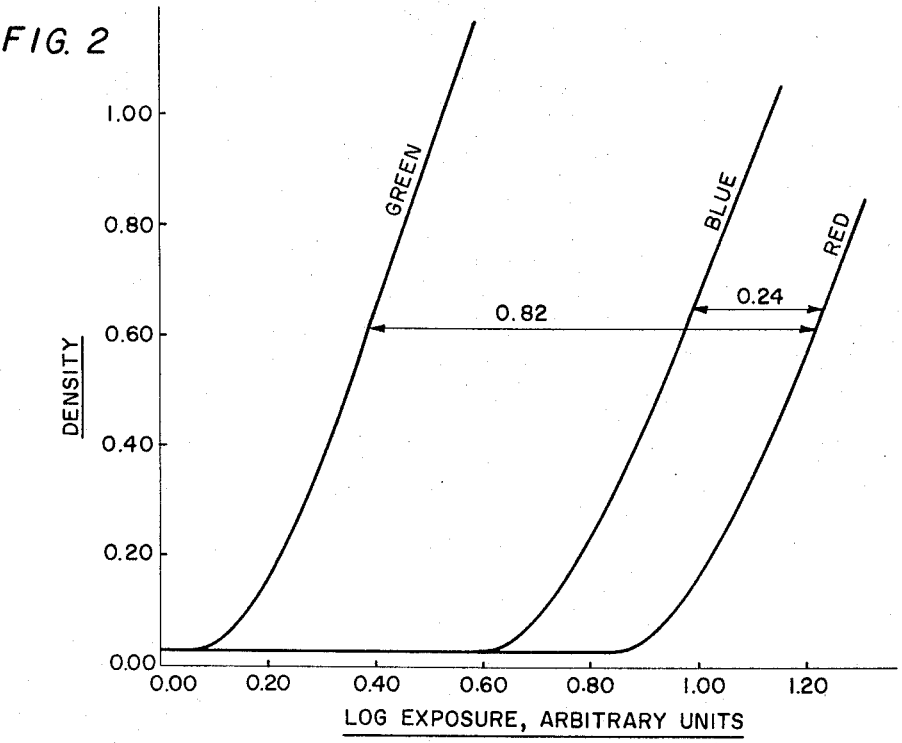

Having so made the test print and generated its characteristic curves as shown in FIG. 2, one may calculate the adjustment to any two of the three exposures necessary to shift the curves into coincidence, at which exposures the emulsion will be balanced. By inspection of FIG. 2, it is apparent that, if one chooses arbitrarily to use the red exposure time as a base, the green and blue exposure times must be reduced (by different amounts) in order to shift the green and blue curves rightward into coincidence with the red curve. The necessary shifts correspond to a decrease in Log (green) Exposure of 0.82, and a decrease in Log (blue) Exposure of 0.24. Since a decrease in exposure is required, the green and blue test print exposure times are divided by the antilogs of 0.82 and 0.24, respectively, yielding new green and blue exposure times of 4.9 seconds and 7.0 seconds, respectively, in addition to the red exposure time of 5.0 seconds used as a base. These exposure times will result in a properly balanced color print. If more or less overall exposure is desired in the print, other times proportional to those calculated may be used, or neutral density filters may be used to adjust the total exposure without altering the color balance. It is to be understood that neutral density filters may be used with one or more of the three exposures to affect the color balance instead of altering the time(s) of exposure. For example, adding a neutral density filter whose value is 0.82 to the green filter has exactly the same effect on the green exposure as dividing the exposure time by the antilog of 0.82.

We wish it to be understood that we do not desire to be limited to the exact details as described, for obvious modifications will occur to a person skilled in the art. The sole prerequisite to the application of the method of this invention is that the test print be made through the non-imaged, processed portion of the film.

What is claimed is:

1. Method of determining the proper color balance in making a color print in color photography from a color negative including the steps of A. exposing a continuous density wedge or step tablet through the clear, unexposed and processed portion of a color negative photographic emulsion and a color compensating filter pack including a combination of at least one magenta filter selected from the group of magenta filters of 0.05, 0.10, 0.20, 0.30, 0.40, and 0.50 nominal density value and at least one yellow filter selected from the group of yellow filters of 0.05, 0.10, 0.20, 0.30, 0.40, and 0.50 nominal density value to make a test print, B. determining the densities to red, green, and blue light of the test print, C. plotting three discrete characteristic curves showing the relationship between the respective densities to red, green, and blue light and log exposure, D. determining from each of said curves the adjustment of the exposures to green and blue light required to shift the green and blue curves into coincidence with the red curve and produce equal densities to red, green and blue light on the printing medium, E. converting the required amounts of exposure adjustment into equivalent amounts of density units for the magenta and yellow filters in the color compensating filter pack, F. determining the actual effective density for the magenta and yellow filters in the color compensating filter pack by determining the transmission densities to red, green, and blue light of magenta and yellow filters of 0.05, 0.10, 0.20, 0.30, 0.40, and 0.50 nominal density value, subtracting an amount of density equal to the red density from each of the three densities and reducing the red density to zero, G. preparing a TABLE having an ordinate and an abscissa axis, labelling each axis in intervals of 05 nominal density units from 0 to 100, said ordinate units referring to the nominal value of a color compensating magenta filter of a filter pack, said abscissa units referring to the nominal value of a color compensating filter of a filter pack, ruling horizontal and vertical lines between said units to form a network of squares, each of said squares representing a particular magenta-yellow filter pack whose nominal values of magenta and yellow filtration corresponds to the respective ordinate and abscissa values intersecting at that square, H. totalling the equivalent densities to green light of all the filters in a magenta-yellow filter pack and totalling the equivalent densities to blue light of all the filters in a magenta-yellow filter pack and entering these totals in the square of the TABLE associated with that filter pack such that the upper number in the square represents the equivalent density to green light and the lower number in the square represents the equivalent density to blue light, I. locating the square in the TABLE intersected by the color compensating filter pack of step (A), and J. adjusting the respective values in the square by the equivalent density units obtained in step (E) to obtain the equivalent densities of the filter pack which will balance the emulsion.

2. Method of determining the proper color balance in making a color print in color photography from a color negative including the steps of A. exposing a continuous density wedge or step tablet through the clear, unexposed and processed portion of a color negative photographic emulsion and a color compensating filter pack including a combination of at least one cyan filter selected from the group of cyan filters of 0.05, 0.10, 0.20, 0.30, 0.40, and 0.50 nominal density value and at least one yellow filter selected from the group of yellow filters of 0.05, 0.10, 0.20, 0.30, 0.40, and 0.50 nominal density value to make a test print, B. determining the densities to red, green, and blue light of the test print, C. plotting three discrete characteristic curves showing the relationship between the respective densities to red, green, and blue light and log exposure, D. determining from each of said curves the adjustment of the exposures to red and blue light required to shift the red and blue curves into coincidence with the green curve and produce equal densities to red, green and blue light on the printing medium, E. converting the required amounts of exposure adjustment into equivalent amounts of density units for the cyan and yellow filters in the color compensating filter pack, F. determining the actual effective density for the cyan and yellow filters in the color compensating filter pack by determining the transmission densities to red, green, and blue light of cyan and yellow filters of 0.05, 0.10, 0.20, 0.30, 0.40, and 0.50 nominal density value, subtracting an amount of density equal to the green density from each of the three densities and reducing the green density to zero, G. preparing a TABLE having an ordinate and an abscissa axis, labelling each axis in intervals of 05 nominal density units from 0 to 100, said ordinate units referring to the nominal value of a color compensating cyan filter of a filter pack, said abscissa units referring to the nominal value of a color compensating yellow filter of a filter pack, ruling horizontal and vertical lines between said units to form a network of squares, each of said squares representing a particular cyan-yellow filter pack whose nominal values of cyan and yellow filtration corresponds to the respective ordinate and abscissa values intersecting at that square, H. totalling the equivalent densities to red light of all the filters in a cyan-yellow filter pack and totalling the equivalent densities to blue light of all the filters in a cyan-yellow filter pack and entering these totals in the square of the TABLE associated with that filter pack such that the upper number in the square represents the equivalent density to red light and the lower number in the square represents the equivalent density of blue light, I. locating the square in the TABLE intersected by the color compensating filter pack of step (A), and J. adjusting the respective values in the square by the equivalent density units obtained in step (E) to obtain the equivalent densities of the filter pack which will balance the emulsion.

3. Method of determining the proper color balance in making a color print in color photography from a color negative including the steps of A. exposing a continuous density wedge or step tablet through the clear, unexposed and processed portion of a color negative photographic emulsion and a color compensating filter pack including a combination of at least one magenta filter selected from the group of magenta filters of 0.05, 0.10, 0.20, 0.30, 0.40, and 0.50 nominal density values and at least one cyan filter selected from the group of cyan filters of 0.05, 0.10, 0.20, 0.30, 0.40, and 0.50 nominal density value to make a test print, B. determining the densities to red, green, and blue light of the test print, C. plotting three discrete characteristic curves showing the relationship between the respective densities to red, green, and blue light and log exposure, D. determining from each of said curves the adjustment of the exposures to green and red light required to shift the green and red curves into coincidence with the blue curve and produce equal densities to red, green and blue light on the printing medium, E. converting the required amounts of exposure adjustment into equivalent amounts of density units for the magenta and cyan filters in the color compensating filter pack, F. determining the actual effective density for the magenta and cyan filters in the color compensating filter pack by determining the transmission densities to red, green, and blue light of magenta and cyan filters of 0.05, 0.10, 0.20, 0.30, 0.40, and 0.50 nominal density value, subtracting an amount of density equal to the blue density from each of the three densities and reducing the blue density to zero, G. preparing a TABLE having an ordinate and an abscissa axis, labelling each axis in intervals of 05 nominal density units from 0 to 100, said ordinate units referring to the nominal value of a color compensating magenta filter of a filter pack, said abscissa units referring to the nominal value of a color compensating cyan filter of a filter pack, ruling horizontal and vertical lines between said units to form a network of squares, each of said squares representing a particular magenta-cyan filter pack whose nominal values of magenta and cyan filtration corresponds to the respective ordinate and abscissa values intersecting at that square, H. totalling the equivalent densities to green light of all the filters in a magenta-cyan filter pack and totalling the equivalent densities to red light of all the filters in a magenta-cyan filter pack and entering these totals in the square of the TABLE associated with that filter pack such that the upper number in the square represents the equivalent density to green light and the lower number in the square represents the equivalent density to red light, I. locating the squre in the TABLE intersected by the color compensating filter pack of step (A), and J. adjusting the respective values in the square by the equivalent density units obtained in step (E) to obtain the equivalent densities of the filter pack which will balance the emulsion.

4. Method of determining the proper color balance in making a color print in color photography from a color negative including the steps of A. exposing a continuous wedge or step tablet each of three times through the clear, unexposed and processed portion of a color negative photographic emulsion with red, blue, and green light in succession in any order and in a manner such that definite amounts of respective red, blue, and green light energy reach the paper during each exposure to make a test print, B. determining the densities to red, green, and blue light of the test print, C. plotting three discrete characteristic curves showing the relationship between the respective densities to red, green, and blue light and log exposure, and D. calculating the adjustment to any two of the three exposures necessary to shift the curves into coincidence.

* * * * *